United States Patent Office 3,045,646
Patented July 24, 1962

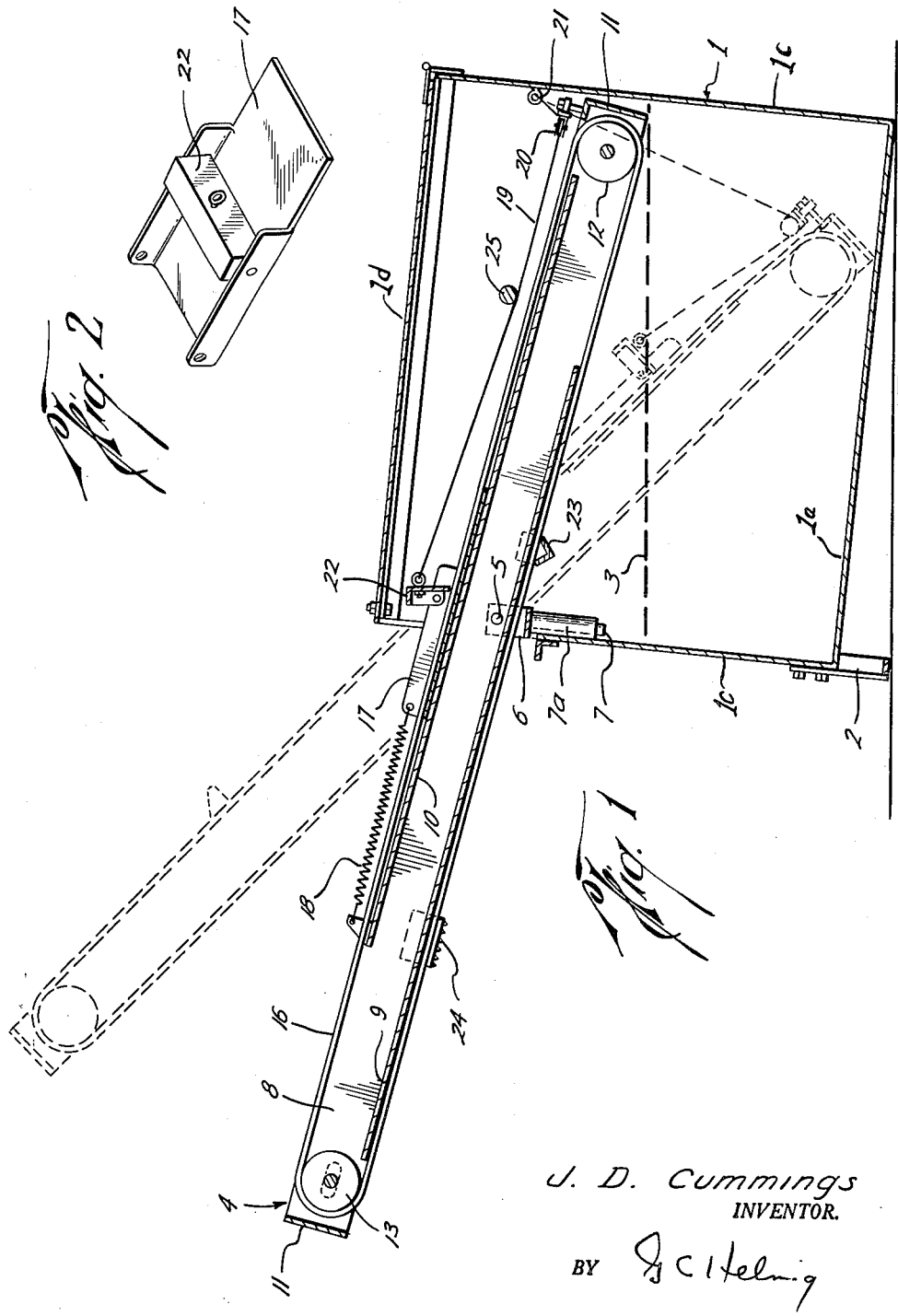

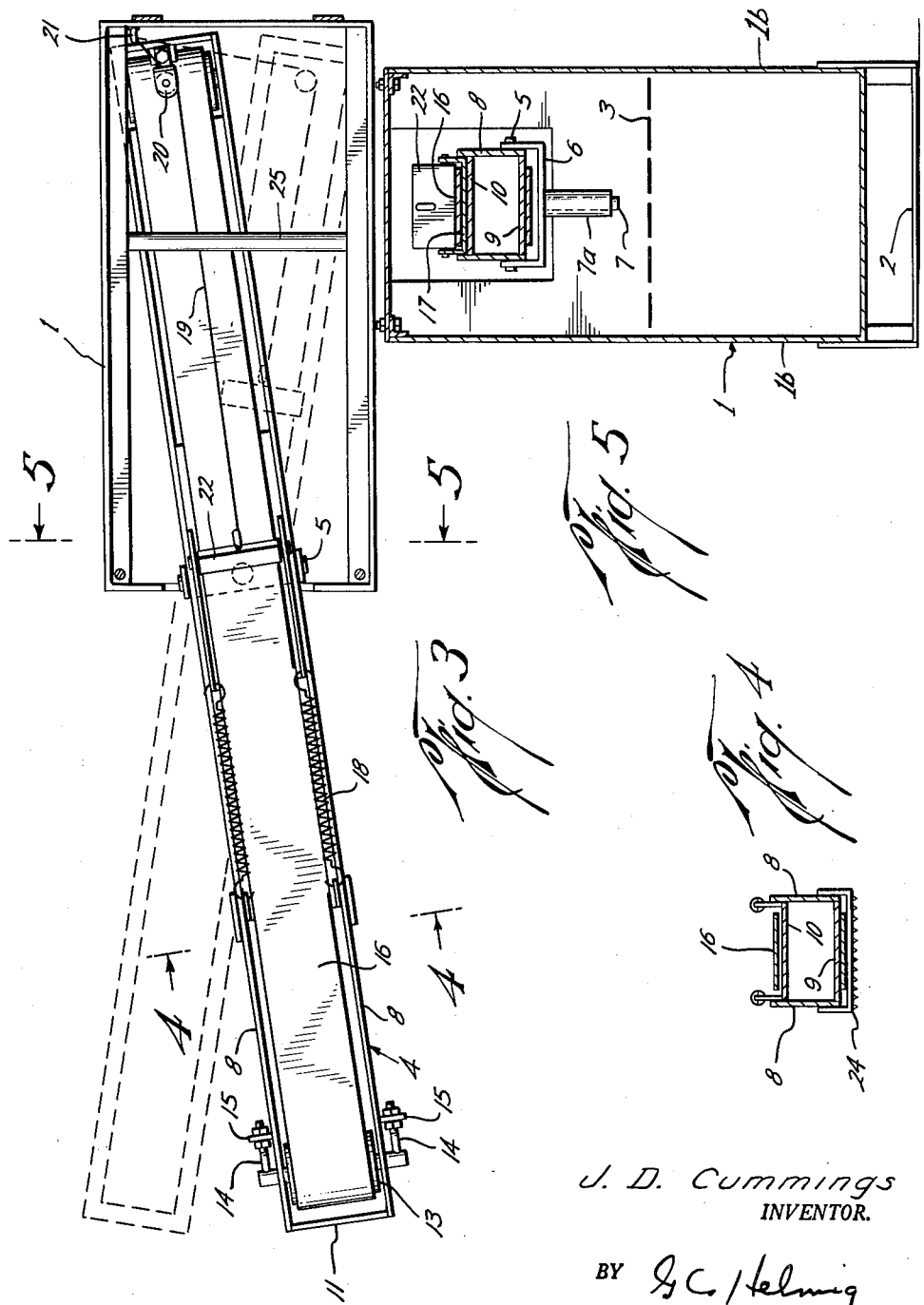

3,045,646
ANTIVERMIN TREATMENT FOR ANIMALS
James D. Cummings, Rio Vista, San Marcos, Tex.
Filed May 2, 1961, Ser. No. 107,126
12 Claims. (Cl. 119—157)

This invention relates to antivermin treatment of animals and more particularly to improved apparatus for the self application by cattle and other livestock of a liquid having some emollient characteristics and carrying pesticides to get rid of fleas, lice, worms, ticks and other skin and hide parasites and disease carrying pests. Animals bothered by stinging, biting and boring vermin will rub and scratch themselves against any convenient object and often rupture the skin and open bloody sores which aggravate discomfort and invite vermin infestation. Absence of relief leads to ill temperament and sickness and causes weight reduction and loss of butchering and hide value. For promoting health and contentment, insecticides are commonly mixed with soothing carrier oil and applied by dipping vat technique, by powered pump spray equipment or by other means including saturated cloths placed in pens and fields for animals to rub against. These procedures can be costly and require manpower and time, with much dripping wastage of treating materials.

It is an object of the present invention to provide an improved self treating machine involving a few simple parts which can be put together at small expense and left untended in a pasture or feed lot for automatically transferring treatment liquid from a storage tank without dripping wastage to an animal upon its movement under and in back scratching relation to an overhead structure.

Another object of the invention is to provide animal back scratching equipment comprising a treatment liquid-carrying endless belt entrained for circuit travel through a back scratching region and longitudinally on a shiftable beam so that portions of the belt will be submerged in tank contained liquid and advanced by steps in the circuit incident to shifting or stroking movement of the belt carrying beam under force transmitted from animal movements at the back contacting region, at which the treatment material is transferred or rubbed from the belt and onto the animal's body.

A further object is to provide a belt carrier in the form of an oscillatory beam having lever arms projecting oppositely from an intermediate horizontal rocker mounting axis adjoining one side of a liquid tank into which one lever arm dips upon elevation of the other lever arm containing a downwardly facing back scratching area and which oscillation of the beam is utilized for clamping a motion transmitting device to the belt and advancing the same longitudinally of the beam on beam movement in one direction and for unclamping and restoring the motion transmitting device on rocker beam movement in the other direction.

A still further object is to pivotally mount a belt carrying lever beam for universal rocking in all directions transversely of beam length and to harness the swing, whatever its angle, for moving forward the liquid loaded belt.

Additional objects and advantages will become apparent from the following specification having reference to the accompanying drawings wherein FIG. 1 is a vertical sectional view on the longitudinal center line of the improved machine; FIG. 2 is a detail and enlarged perspective view of a belt engaging reciprocatory slide tray and one-way clutch structure for effecting advance of the belt with tray travel in one direction; FIG. 3 is a top plan view of the machine and FIGS. 4 and 5 are transverse sections on lines 4—4 and 5—5 respectively in FIG. 3.

In the drawings there is illustrated a long, narrow and deep tank 1, conveniently formed of bottom, side and end walls 1a, 1b and 1c respectively, of relatively light flat sheet metal welded or otherwise secured at adjoining edges. A hinged closure lid 1d may be added to exclude dirt and rain. Vertical tank wall height dimension can be minimized by raising the bottom wall above ground level. As shown, only the front of the tank is lifted. Adjacent the front wall of the tank, a dependent U-shaped strap 2 extends below the bottom wall as an elevating pedestal which tilts the tank backwardly from the region in which a steer or other animal will move for treatment. To tie down the tank against displacement, the U-shaped support strap 2 can serve usefully to receive anchoring or loading devices. After the tank is placed in an animal pen, it will be supplied with liquid to any suitable level 3 according to treatment needs. Such liquid, usually a light hydrocarbon oil and most often low cost kerosene, will have mixed with it a suitable pesticide for transfer to an animal standing or moving through a treating station immediate the tank.

Transfer of liquid carried pesticide is effected by a traveling belt mounted for engagement by an animal whose muscular and back and forth rubbing movements are depended upon to dip the belt into the liquid, both to immerse and wet the belt and to agitate or stir the liquid and maintain the pesticide more uniformly distributed within the liquid, and in addition to advance the wetted belt for transfer of liquid mixture onto the animal at the region of rubbing contact. The belt is carried and supported on a rocker beam or elongated boom assembly 4 pivotally mounted intermediate its opposite ends on a transverse horizontal trunnion or axle 5 supported by a forked cradle or bracket 6 bearing on the tank and having a dependent gudgeon pin 7 fitted to turn on a substantially vertical axis within a tubular socket 7a welded to the upper end of the front wall of the tank 1. In transverse width the belt and beam assembly is considerably less than interior tank width, so that there is adequate working clearance for horizontal oscillation about the vertical pivot 7 between the full and broken line positions illustrated in FIG. 3.

The two lever arms of the rocking beam 4 projected oppositely from the fulcrum mounting 5 preferably differ in length for a weight advantage. The shorter or lighter arm is inboard of the tank and is adapted to swing into and out of the liquid upon beam teetering action. The longer and heavier lever arm projects longitudinally beyond or in outboard relation to the tank and in overhead relation to a pathway or station to be occupied by an animal whose back can rub against the underside of the outboard lever arm whereby to elevate or swing the lever arm upwardly. The unbalanced weights of the two lever arms afford a yielding bias in one vertical direction of swing for opposing upward swing of the longer lever arm and for maintaining the same in contact with the animal.

To limit the vertical stroke of the oscillatory beam in the weight biased direction, a cross bar 25 is secured to and extends between the tank side walls for stop abutment upwardly by the inboard beam lever arm. This positions the beam assembly when not in use above the liquid and in the full line position shown in the drawings so that the outboard lever arm is somewhat below the minimum height of animals in the herd. When any animal moves under the outboard lever arm, the beam will rest vertically on the animal's head, neck or back and will follow changes in position of the animal. A free universal beam movement in all angular directions transversely of its length can occur vertically about the axle 5 and horizontally about the trunnion pin 7 through ranges between limits indicated in the drawing by dotted line beam relationships. Lateral beam oscillation with animal fore and aft movements is accommodated by the lesser width of the inboard lever arm as related to the tank and predetermined width dimensional differences establish opposite ends of horizontal swing by beam end abutment with the spaced apart tank side walls.

The rocker beam assembly 4 comprises essentially a box section made up of flat sheet steel strips including a pair of transversely spaced and vertically disposed side straps 8—8, a bottom horizontal plate 9, a top horizontal plate 10 and opposite vertical end walls 11—11. Rotatably mounted rollers 12 and 13 are located at opposite ends of the beam and within the box section and the shaft of at least one of the rollers, as, for example, the roller 13 as seen in the drawing, has its opposite ends fitted to longitudinally extending studs 14, each extending through an anchorage lug 15 carried by an adjoining side strap 8 with lock nuts engaging the stud 14 on opposite sides of the anchor lug 15 for adjustably locating the roller 13. Such longitudinal adjustment controls the degree of slack in the endless belt 16 whose opposite ends are looped or entrained on the rollers 12 and 13 and whose upper and lower longitudinal reaches respectively overlie the upper beam plate 10 and underlie the lower beam plate 9. This belt 16 is of an absorbent material such as a multi-ply cotton fabric.

The upper belt reach also runs over the top of a slidable tray or plate 17 shiftably supported on the upper face of the top beam plate 10 and guided for back and forth reciprocation by bearing engagement at its sides with the upper edge portions of the transversely spaced beam straps 8 which project slightly above the upper surface of the plate 10. A pair of coil tension springs 18—18 each have one end joined to the slide tray 17 and its opposite end anchored or grounded on the beam 4 to yieldably resist movement of the slide tray in a longitudinal direction toward the belt roller 12 and to restore the slide tray after such movement has occurred. Movement of the slide tray against its retracting springs 18 will occur when the inboard lever arm is depressed into the tank and occurs because the tray is fastened to one end of a flexible cable 19 which at an intermediate point is entrained on or runs around a guide pulley 20 hinged at the end of the lever and from which the cable extends laterally of the swing arc direction of the rocker lever. The cable end opposite to that fastened to the slide tray 17 is anchored conveniently to an apertured bracket 21 welded on the wall of the tank near the upper limit of the inboard lever arm end. Downward swing travel of the beam at the guide pulley 20 and lateral swing away from the cable anchor bracket 21 are each transmitted through the cable 19 to the tray and swing movements in the opposite direction slack the cable and enable the coil springs 18 to return the tray.

Movement of the tray 17 toward the pulley 20 is harnessed to clamp the belt and carry the belt in a clockwise direction, as viewed in FIG. 1. For that purpose, the tray connected end of the cable is secured to the upper end of a rockable clamp plate 22 pivoted in the sides of the tray on a horizontal axis and having a downward crank arm extension terminated in a camming lip across the width of the belt 16 for co-operation with the bottom of the shiftable tray in clamping an adjacent portion of the belt to the tray. Thus when the beam assembly is rocked vertically or laterally or in any combination to shift the cable pulley 20 away from the anchor bracket 21, tension of the cable 19 first rocks the pivoted plate 22 to crank its clamping lip extension toward the bottom wall of the tray 17 whereby to grip the belt 16. Thereafter, the tray will be dragged toward the cable guide pulley 20 and carry the belt with it. On swing of the rocker beam in the opposite vertical or lateral directions, a slackness will occur in the pull cable 19 for release of the clamping action and the restoration of the slide tray 17 under the pull of the coil springs 18.

The tension force exerted by the pull springs 18 will to some slight extent resist elevation of the outboard arm of the rocker beam and supplement its unbalanced lever arm weights.

Within the tank region and adjacent the pivot axis 5 is a U-shaped member 23 whose side arms are secured to the beam 4 and whose cross bar is an angle or V-section strap arranged for double edge wiping engagement with the underside of the traveling belt as the previously submerged belt portion leaves the tank and moves into the animal back scratching region on the underside of the beam. Such wiping contact will scrape excess liquid from the saturated belt and for return to the tank supply. Any number of dependent U-shaped straps, one of which is shown at 24, may be carried by the rocker beam 4 to underlie the traveling belt outwardly from the pivot axis 5 and generally in the back scratching region. Such strap arrangement helps guide the belt and resist lateral displacement thrust incident to back scratching movements. The strap under surfaces preferably are slightly roughened and may be formed of slit and expanded sheet metal to serve somewhat for combing and cleaning purposes.

In use, the animals of a herd soon learn to enjoy the use of the machine as described and they will either walk under or stand beneath the outrigger beam and move their heads, shoulders and hips and arch their backs in rubbing contact with the belt, which continues to rest downwardly. With such animal movement, the oscillatory beam is rocked up and down and sideways, whereby the belt portion above the tank dips into and out of the liquid and advances in steps from the tank for transferring the treatment material directly onto the animal without appreciable drippage loss. Liquid carried by the absorbent belt is in quantity to stay in the belt except for contact transfer. Its fluidity allows transferred liquid to seep downward on the hide and virtually cover the entire body and legs after only a few repeated applications.

The drawing illustrates a single embodiment as a preferred form of the invention but such modifications can be made in the detail as are contemplated by the scope of the appended claims.

What is claimed is:

1. In an animal self treating machine, a treatment liquid containing tank, an elongated oscillatory beam, a fulcrumed mounting for the beam intermediate its ends and above the tank liquid level providing a horizontal axis about which the beam can oscillate with one arm of the beam projecting away from the tank and the other beam arm projecting over the tank for swinging into and out of the tank contained liquid and having a cable guide element near its free end, an endless belt of liquid absorbent material having upper and lower reaches extending longitudinally above and below said beam and having opposite return bends adjacent the beam ends, a tray interposed between the upper belt reach and the top of the beam and slidably guided by the beam for longitudinal reciprocation, a rockable clamp element above the top of the upper belt reach and pivotally connected with the tray on a transverse axis, a dependent crank arm portion carried by the clamp element for movement therewith toward the tray for clamping an adjacent portion of the belt between the tray and the crank arm portion, a pull cable having one end secured to said clamp element and extending therefrom longitudinally of the beam to said cable guide element for engagement therewith by an intermediate portion of the cable, means fixedly anchoring the opposite end of the cable relative to the tank and spring means interposed between the slide tray and the beam for yieldably urging tray movement in the direction away from said guide element.

2. In an animal self treating machine, an oscillatory beam having longitudinally spaced apart belt engaging guide rollers, an endless belt having opposite return bends engaging said rollers with upper and lower belt reaches extending lengthwise of the beam, means pivotally mounting an intermediate portion of the beam for the projection therefrom of one beam lever arm in overhead relation to an animal for animal contact with the belt in the lower reach thereof, a liquid containing tank beneath the other beam lever arm for receiving the same and accommodating its swing through the tank upon beam oscillation, a slide member engaging one face of the belt in one reach thereof and longitudinally slidably mounted on the beam, a rock element pivotally mounted in the slide member and provided with a crank arm engageable with the opposite face of the belt to clamp the same on the slide member upon rocking of said element in one direction, a cable guide carried by the beam in spaced relation to the slide member, a pull cable fitted intermediate its length to said guide and projected therefrom in one cable length portion in a direction longitudinally of the beam to a cable end connection with the rock element in radially spaced relation to the rock axis and projected in another cable length portion from the guide to a cable end connection anchored relative to the tank so that beam oscillation away from said anchored end connection imparts pull through the cable first to rock said rock shaft for clamping the belt against the slide member and then to shift the slide member and clamped belt and means active to return the slide member upon release of cable tension upon beam oscillation toward said anchored end connection.

3. In an animal self treating machine, an endless belt adapted for loop circuit travel, an elongated boom on which the belt is looped for circuit travel, means mounting said boom for back and forth movement in response to force applied by animal contact with the belt in one portion of its travel path, other means responsive to boom movement to impart circuit travel to the belt and a treatment liquid containing tank positioned for such movement therein of the boom and the belt in another portion of its travel path and immersion of the last mentioned belt portion within the tank contained liquid for liquid transfer upon belt travel to the area of contact therewith by an animal.

4. In an animal treatment machine, a rocking beam pivotally mounted on a horizontal axis for oscillation and adapted for swing movement in one direction by lifting force transmitted to one arm of the beam by animal movement beneath said arm, means effective on the beam to yieldably oppose beam movement in said direction, an endless belt fitted to both beam arms for circuit travel through an elongated loop path which in part extends beneath said one beam arm for animal engagement with the belt, a reciprocatory member mounted by the beam for movement longitudinally thereof and provided with a releasable belt engaging clamp, belt travel controlling means responsive to beam oscillation in opposite directions for clamping the belt and shifting said member in one direction concurrently with beam swing in one direction and for releasing the clamp and shifting said member in the other direction concurrently with beam swing in the other direction and a treatment liquid tank into which the other beam arm and the belt portion fitted thereto dip on the lift stroke of the first mentioned beam arm.

5. In an animal treatment machine, a treatment liquid containing tank, an endless belt adapted for travel through a loop circuit including opposite end return bends and upper and lower reaches extending between said return bends, means positioning one of said return bends at the tank for liquid presentment to the belt, an oscillatory lever arm pivotally mounted on a rock axis adjacent the tank and projected laterally therebeyond for free end swing action upon engagement and support by an animal, means positioning the other return bend on the lever arm in longitudinally spaced relation to the lever arm pivot axis to present a portion of the belt lower reach beneath the pivoted lever arm as an animal back bearing surface and means responsive to oscillation of the lever arm to transmit drive force to the belt and effect loop circuit travel of the belt.

6. In an animal treatment machine, an animal walkway, a vertically movable beam extended transversely across the walkway and adapted to be borne by an animal in the walkway, an endless belt mounted for circuit travel lengthwise of the beam and presented in a portion of its travel circuit in underlying relation to said beam as an animal bearing contact surface, drive transmitting means engageable with the belt and responsive to beam vertical movement in effecting belt circuit travel and a treatment liquid containing tank positioned beneath and for movement of the beam into and out of tank contained liquid to agitate the same and wet the belt for liquid transfer to an animal at the bearing contact surface.

7. In an animal treatment machine, a tank to contain treatment liquid, a rocking beam pivotally mounted on the tank for vertical swing action and positioned with one beam arm projected from the tank for dipping into the tank and the other beam arm projected outwardly beyond the tank and adapted to be displaced upwardly when borne on the back of an animal therebelow, belt guides carried by the beam in longitudinally spaced apart relation on opposite sides of the beam pivot axis, an endless belt having return bends engaged with said guides for circuit travel and having an upper belt reach running along the top of the beam and a lower reach running beneath the beam and providing an animal back bearing portion in the region of the outwardly projected beam arm, a pair of belt clamping members receiving the belt therebetween and slidably supported by the beam for relative longitudinal reciprocation, means movably interconnecting said members for their relative movement toward and from belt clamping relation, a cable guide near the free end of one of said beam arms, a pull cable fitted intermediate its ends to said guide and projected therefrom to one end in a direction longitudinally of the beam and projected away from the guide to its other end, a fixed anchorage connection with said other end of the pull cable, means coupling said one end of the pull cable to one of said members whereby rocking beam swing in one direction tensions the pull cable for clamping the belt between the members and for thereafter imparting a longitudinal stroke to the members and the belt clamped therebetween and rocking beam swing in the other direction releases tension on the pull cable and means active upon such release of tension for moving said members from belt clamping relation and in a reverse stroke longitudinal direction.

8. An animal self treating machine of the character described, including a tank to contain treatment liquid, an endless belt for liquid travel from the tank to an animal, a belt supporting rocker beam accommodating circuit travel of the belt and having one beam portion extending inboard of the tank and another portion extending outboard of the tank and presenting a portion of the belt for contact by an animal, means mounting said rocker beam for oscillation in response to such contact and through an oscillatory stroke in which said inboard portion dips into and agitates the tank contained liquid and wets the belt and a belt drive connection transmitting movement of beam oscillation and imparting circuit travel to the belt relative to the beam.

9. In an animal treatment machine, a belt supporting beam, a supporting structure mounting said beam in overhead relation to an animal walkway and for movement in response to force transmitted by an animal in the walkway, an endless belt mounted on the beam for circuit travel relative thereto and for bearing engagement in one portion of the circuit by an animal in the walkway, drive means responsive to beam movement and having beam movement transmitting connection with the belt to effect circuit travel thereof and means to apply a treatment material to the belt in another portion of its circuit.

10. In an animal treatment machine, a treatment liquid containing tank, an overhead rocker beam having one arm in inboard relation with and for oscillation through liquid contained within said tank and another arm in outrigger relation to the tank, universal pivot mounting means supporting said beam between its arms for vertical and horizontal oscillation, an endless belt entrained on the beam for circuit travel to carry treatment material from the tank to the outrigger beam arm and belt drive means responsive to beam oscillations, both vertically and horizontally.

11. In an animal treatment machine, a tank to contain treatment material, an oscillatory beam pivotally mounted on an axis to present one end of the beam within the tank and for lateral swing movement in response to animal applied force transmitted thereto, an endless belt entrained for circuit travel on the beam between the tank and an animal contacting region and also movable upon beam oscillation with said one end of the beam through the tank contained treatment material for loading the belt with the material and belt drive means responsive to beam swing movement in imparting circuit travel to the belt.

12. In a self treatment machine for animals, a tank to contain treatment material, a rocker beam centrally pivotally mounted relative to the top of the tank for the swing of one beam lever arm into and out of the tank and for the projection of the other beam lever arm in outboard relation to the tank as an overhead animal contacting region, said beam being arranged for biased swing thereof in a direction to lower its outboard lever arm, an endless belt entrained by the beam to partake of its swing movement and for circuit travel relative to the rocker beam to present changing portions of the belt in said contact region and motion transmitting means active on the belt in response to beam swing movement to impart circuit travel to said belt.

References Cited in the file of this patent
UNITED STATES PATENTS

| | | |
|---|---|---|
| 1,221,675 | Carson | Apr. 3, 1917 |
| 2,678,632 | Brown | May 18, 1954 |
| 2,768,608 | Anderson | Oct. 30, 1956 |
| 3,008,452 | Baird | Nov. 14, 1961 |